(12) United States Patent
Casey et al.

(10) Patent No.: US 10,422,320 B1
(45) Date of Patent: Sep. 24, 2019

(54) POWER MANAGEMENT FOR AN AIRBORNE WIND TURBINE

(71) Applicant: Makani Technologies LLC, Alameda, CA (US)

(72) Inventors: Leo Casey, San Francisco, CA (US); Geoffrey Dolan, San Francisco, CA (US)

(73) Assignee: Makani Technologies LLC, Alameda, CA (US)

( * ) Notice: Subject to any disclaimer, the term of this patent is extended or adjusted under 35 U.S.C. 154(b) by 0 days.

(21) Appl. No.: 14/985,685

(22) Filed: Dec. 31, 2015

(51) Int. Cl.
| | | |
|---|---|---|
| *F03D 9/00* | (2016.01) | |
| *H02M 7/04* | (2006.01) | |
| *F03D 5/00* | (2006.01) | |
| *F03D 11/00* | (2006.01) | |

(52) U.S. Cl.
CPC ............... *F03D 9/003* (2013.01); *F03D 5/00* (2013.01); *F03D 11/0091* (2013.01); *H02M 7/04* (2013.01)

(58) Field of Classification Search
CPC ........ F03D 9/009; F03D 5/00; F03D 11/0091; F03D 9/003; H02M 7/04
USPC ....................................... 290/44, 55; 318/98
See application file for complete search history.

(56) References Cited

U.S. PATENT DOCUMENTS

| | | | | |
|---|---|---|---|---|
| 7,317,261 B2 * | 1/2008 | Rolt | ...................... | B64C 39/022 290/55 |
| 8,049,353 B1 * | 11/2011 | Eng | ......................... | F01D 15/10 290/1 A |
| 8,109,711 B2 * | 2/2012 | Blumer | ...................... | B64B 1/50 415/121.3 |
| 8,148,838 B2 | 4/2012 | Ferguson | | |
| 8,350,403 B2 * | 1/2013 | Carroll | ................... | B64C 39/022 290/55 |
| 8,800,931 B2 * | 8/2014 | Vander Lind | ........ | A63H 27/002 244/154 |
| 8,810,177 B2 * | 8/2014 | Schulz | .............. | H02M 7/53875 318/400.1 |
| 8,866,334 B2 | 10/2014 | Donnelly et al. | | |
| 9,109,575 B2 * | 8/2015 | Weddendorf | ............. | F03D 5/00 |
| 9,151,272 B2 * | 10/2015 | Goessling | ............... | F03D 7/026 |
| 2002/0181261 A1 * | 12/2002 | Gaudreau | ............. | H02M 1/088 363/108 |
| 2006/0072263 A1 * | 4/2006 | Deng | ...................... | H02J 9/062 361/62 |

(Continued)

*Primary Examiner* — Tulsidas C Patel
*Assistant Examiner* — Joseph Ortega
(74) *Attorney, Agent, or Firm* — McDonnell Boehnen Hulbert & Berghoff LLP

(57) ABSTRACT

Disclosed herein are systems and methods related to electric power transfer between an aerial vehicle of an airborne wind turbine and a power grid. An example power conversion system may include power converters, a DC bus connecting the power converters to the aerial vehicle, and an AC bus connecting the power converters to the power grid. The power converters may be configured to provide AC/DC power conversion between the aerial vehicle and the power grid. The power conversion system may also include switches operable to either (i) electrically connect a respective power converter to the DC bus or electrically isolate the respective power converter from the DC bus. The power conversion system may also include one or more power supplies that can be connected to the DC bus to provide backup power in the event a power converter or the power grid malfunctions.

16 Claims, 8 Drawing Sheets

(56) References Cited

U.S. PATENT DOCUMENTS

| | | | | |
|---|---|---|---|---|
| 2008/0165555 | A1* | 7/2008 | Deng | H02J 9/062 |
| | | | | 363/95 |
| 2009/0021021 | A1* | 1/2009 | Grenier | F03D 15/00 |
| | | | | 290/55 |
| 2009/0212568 | A1* | 8/2009 | Maibach | H02J 3/28 |
| | | | | 290/44 |
| 2010/0295303 | A1* | 11/2010 | Lind | B64C 39/022 |
| | | | | 290/44 |
| 2011/0101692 | A1* | 5/2011 | Bilaniuk | B64B 1/10 |
| | | | | 290/44 |
| 2011/0121570 | A1* | 5/2011 | Bevirt | F03D 5/06 |
| | | | | 290/44 |
| 2011/0127775 | A1* | 6/2011 | Bevirt | B64C 39/022 |
| | | | | 290/55 |
| 2012/0105023 | A1* | 5/2012 | Schauder | H02M 1/42 |
| | | | | 323/207 |
| 2013/0221679 | A1* | 8/2013 | Vander Lind | B64C 31/06 |
| | | | | 290/55 |
| 2014/0049998 | A1* | 2/2014 | Casey | H02M 7/5395 |
| | | | | 363/97 |
| 2014/0211520 | A1* | 7/2014 | Zhang | H02M 1/126 |
| | | | | 363/37 |
| 2014/0246538 | A1 | 9/2014 | Morris et al. | |
| 2014/0321019 | A1* | 10/2014 | Volke | H02M 7/49 |
| | | | | 361/91.1 |
| 2015/0184639 | A1* | 7/2015 | Goessling | F03D 7/026 |
| | | | | 290/44 |
| 2016/0013716 | A1* | 1/2016 | Hur | H02M 1/32 |
| | | | | 363/50 |
| 2017/0126008 | A1* | 5/2017 | Shen | H02J 3/36 |
| 2018/0159316 | A1* | 6/2018 | Aramaki | H02H 7/12 |

* cited by examiner

US 10,422,320 B1

POWER MANAGEMENT FOR AN AIRBORNE WIND TURBINE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

An aerial vehicle of an airborne wind turbine may generate DC electric power and provide such electric power to an AC power grid via an AC/DC power conversion system. The power grid may then transmit and/or distribute the power to remote locations. In some instances, the power grid may provide power to the aerial vehicle so that the aerial vehicle can maneuver to a position and altitude suitable to begin generating power. In some examples, the power conversion system may include a series of power converters that are each configured to provide bidirectional AC/DC power conversion between the aerial vehicle and the power grid. This disclosure describes various ways in which such a power conversion system may be arranged or function to account for malfunctioning of the power grid, one or more power converters, or a motor/generator of the aerial vehicle. For instance, the power conversion system may include one or more backup power converters that are switched into operation when failure of one or more primary power converters is detected. Also, one or more power supplies (e.g., batteries) may be used to provide power to the aerial vehicle if the power grid malfunctions.

In one example, a method includes detecting a fault on an AC bus of a power conversion system. The power conversion system may be configured to provide AC/DC power conversion between an aerial vehicle of an airborne wind turbine and a power grid. The method further includes, in response to detecting the fault, providing, via a power supply of the power conversion system, a first DC electric current to a first power converter of the power conversion system. The method further includes providing, via the first power converter receiving the first DC electric current, an AC electric current to a second power converter of the power conversion system. The AC electric current may pass through at least a portion of the AC bus. The method further includes providing, via the second power converter receiving the AC electric current, a second DC electric current to the aerial vehicle via a DC bus of the power conversion system.

In another example, a method includes determining that a first power converter of a power conversion system is malfunctioning. The power conversion system may be configured to provide AC/DC power conversion between an aerial vehicle of an airborne wind turbine and a power grid. The method further includes, in response to determining that the first power converter is malfunctioning: electrically isolating the first power converter from a DC bus of the power conversion system and electrically connecting a second power converter of the power conversion system to the DC bus.

In yet another example, a power conversion system includes a first power converter that includes (i) a first AC port and (ii) a first DC port. The first power converter may be configured to provide AC/DC power conversion between the first AC port and the first DC port. The power conversion system further includes a second power converter that includes (i) a second AC port and (ii) a second DC port. The second power converter may be configured to provide AC/DC power conversion between the second AC port and the second DC port. The power conversion system further includes an AC bus electrically connected to (i) a power grid, (ii) the first AC port, and (iii) the second AC port. The power conversion system further includes a DC bus electrically connected via a tether to an aerial vehicle of an airborne wind turbine. The power conversion system further includes a first switch operable to either (i) electrically connect the first DC port to the DC bus or (ii) electrically isolate the first DC port from the DC bus, and a second switch operable to either (i) electrically connect the second DC port to the DC bus or (ii) electrically isolate the second DC port from the DC bus.

In yet another example, a method includes determining that a power grid electrically connected to a power conversion system is malfunctioning. The power conversion system may be configured to provide AC/DC power conversion between an aerial vehicle of an airborne wind turbine and the power grid. The method further includes, in response to determining that the power grid is malfunctioning: electrically isolating the power grid from an AC bus of the power conversion system and electrically connecting a power supply of the power conversion system to the DC bus.

These as well as other aspects, advantages, and alternatives, will become apparent to those of ordinary skill in the art by reading the following detailed description, with reference where appropriate to the accompanying drawings.

DETAILED DESCRIPTION

Figure 1:
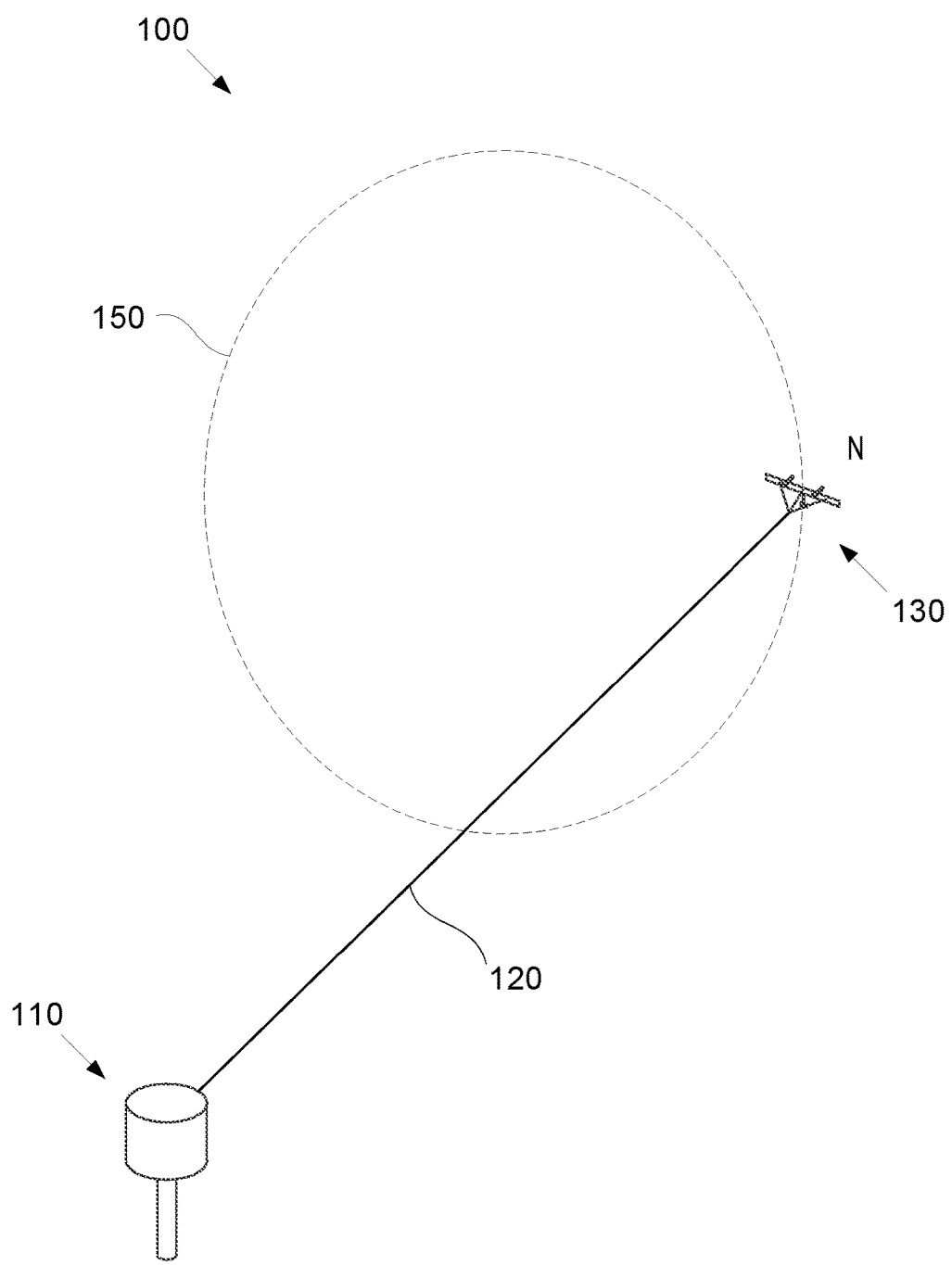
FIG. 1 depicts an airborne wind turbine (AWT), according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

A wind-based power-generation system may include an aerial vehicle connected to a power conversion system via a tether. For example, the aerial vehicle may include a wing and a plurality of dual-purpose motor/generators mounted on the wing. The motor/generators may each include a plurality of blades and can act as a propeller or a wind turbine, depending on the situation. For example, in a motoring mode, the motor/generators may operate as propellers. The power conversion system may provide electrical power to the motor/generators via a conductive portion of the tether, and the propellers may operate to maneuver the aerial vehicle to a position and altitude suitable for beginning crosswind flight.

In crosswind flight, the aerial vehicle may operate in a power-generating mode. The aerodynamic shape of the wing and/or adjustable flaps, in conjunction with the wind, may be used to maneuver the aerial vehicle along a somewhat circular or elliptical path that is substantially perpendicular to the direction of the wind. As the aerial vehicle travels the crosswind path, air resistance causes the blades of the motor/generators to spin, thereby generating electrical current that travels down the tether to the power conversion system.

The power conversion system may include (bidirectional) power converters that are connected to an alternating current (AC) bus of the power conversion system and connected to a direct current (DC) bus of the power conversion system. More specifically, the power converters may function to transfer power back and forth between the aerial vehicle and a power grid, depending on operating conditions. Thus, in motoring mode, the power converters may receive AC current from the power grid, convert the AC current to DC current, and provide the DC current to the motor/generators of the aerial vehicle via the tether. In generation mode, however, the aerial vehicle generates DC current that is transferred to the power converters via the tether. The power converters of the power conversion system may then use the DC current to provide AC current to the power grid.

The power conversion system may include one or more power converters that are reserved for use as backup power converters. For example, in motoring mode, the aerial vehicle may be powered by a DC voltage generated by a group of primary power converters having their respective DC ports connected in series. In power generation mode, the aerial vehicle may provide DC power to the primary power converters. If a primary power converters fails, a backup power converter may be switched into operation so as to replace the failed primary power converter and provide DC power to, or receive DC power from, the aerial vehicle. Alternatively or additionally, one or more power converters may be configured to increase their respective AC/DC voltage gains, to compensate for a failed power converter.

In addition to power converters, the power conversion system may include one or more power supplies (e.g., batteries) connected in parallel with the respective power converters to serve as backup power in the event that a corresponding power converter fails. In one example, the AC power grid may fail and the batteries may provide backup DC power in lieu of the respective power converters so that the aerial vehicle can hover back to its perch and safely land. In another scenario, one or more motor/generators of the aerial vehicle may fail while in a power generation mode. In this case, a battery may be switched into the circuit to compensate for a loss of DC voltage caused by the motor/generator failure. This may aid in maintaining adequate voltages respectively on the AC bus and the DC bus.

In another example, a power supply corresponding to a first power converter may be used to provide backup power via a second power converter in the event of a power grid failure (e.g., loss of input AC power from the power grid). Referencing the example above, the group of primary power converters may be functioning normally, notwithstanding the power grid failure. If the aerial vehicle is in the air, the power supplies corresponding to the respective group of primary power converters may be switched into operation to provide power to the aerial vehicle so that the aerial vehicle can safely maneuver to the ground. To provide additional power, a power supply corresponding to a backup power converter may be used. The backup power converter might not be switched in to operate on the DC bus of the power conversion system, lest the voltage provided by the DC bus to the aerial vehicle be too high. However, the power supply corresponding to the backup power converter may be used to indirectly provide additional current to the aerial vehicle through the AC bus and other power converters of the power conversion system. By using power supplies that would otherwise go unused because they correspond to backup power converters that are not connected to the DC bus, it may become more likely that the aerial vehicle can land before depleting the energy stored in the power supplies corresponding to the power converters.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 depicts an airborne wind turbine (AWT) 100, according to an example embodiment. In particular, the AWT 100 includes a ground station 110, a tether 120, and an aerial vehicle 130. As shown in FIG. 1, the tether 120 may be connected to the aerial vehicle 130 at a first end and may be connected to the ground station 110 at a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, the ground station 110 may be configured for use on land. However, the ground station 110 may also be implemented on a body of water, such as a lake, river, sea, or ocean. For example, a ground station could include or be arranged on a floating offshore platform or a boat, among other possibilities. Further, the ground station 110 may be configured to remain stationary or to move relative to the ground or the surface of a body of water.

In addition, the ground station 110 may include one or more components (not shown), such as a winch, that may vary a deployed length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands on the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core of the tether 120 may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic, and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150. As shown in FIG. 1, the number of revolutions of the closed path 150 that the aerial vehicle 130 has traveled along may be represented by N.

Figure 2:
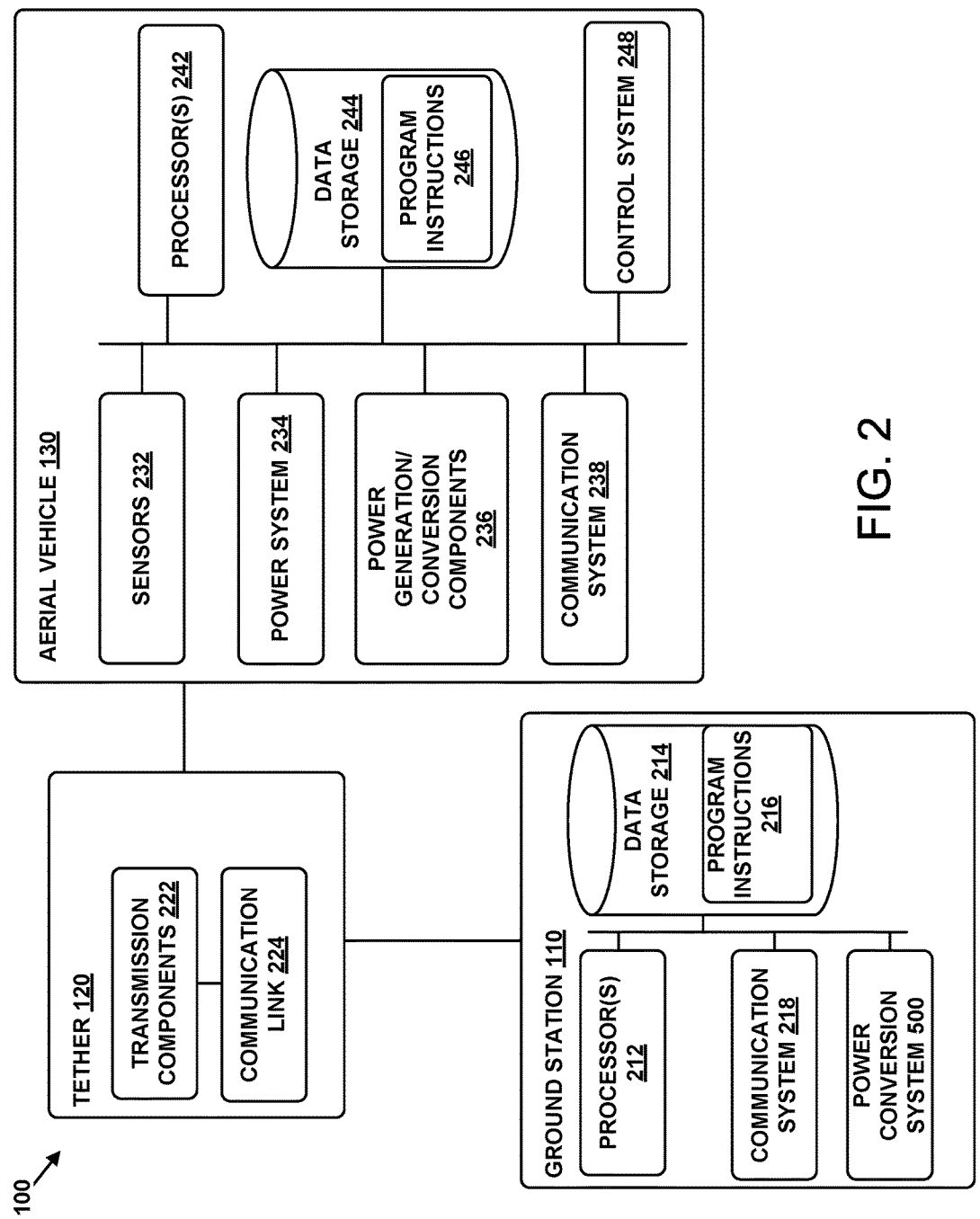
FIG. 2 is a simplified block diagram illustrating components of an AWT, according to an example embodiment.

FIG. 2 is a simplified block diagram illustrating components of the AWT 100.

As shown in FIG. 2, the ground station 110 may include one or more processors 212, data storage 214, and program instructions 216. A processor 212 may be a general-purpose processor or a special-purpose processor (e.g., a digital signal processor, an application-specific integrated circuit, etc.). The one or more processors 212 can be configured to execute computer-readable program instructions 216 that are stored in data storage 214 and are executable to provide any of the functionality described herein.

In some implementations, the processor 212 may be implemented as a Boolean circuit or a combinational logic circuit.

The data storage 214 may include or take the form of one or more computer-readable storage media that may be read or accessed by at least one processor 212. The one or more computer-readable storage media can include volatile and/or non-volatile storage components, such as optical, magnetic, organic, or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 110. As such, the data storage 214 may include program instructions to perform or facilitate some or all of the functionality described herein.

In a further respect, the ground station 110 may include a communication system 218. The communication system 218 may include one or more wireless interfaces and/or one or more wireline interfaces, which allow the ground station 110 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. The ground station 110 may communicate with the aerial vehicle 130, other ground stations, and/or other entities (e.g., a command center) via the communication system 218.

In an example embodiment, the ground station 110 may include communication systems 218 that allows for both short-range communication and long-range communication. For example, the ground station 110 may be configured for short-range communications using Bluetooth and for long-range communications under a CDMA protocol. In such an embodiment, the ground station 110 may be configured to function as a "hotspot," or in other words, as a gateway or proxy between a remote support device (e.g., the tether 120, the aerial vehicle 130, and other ground stations) and one or more data networks, such as a cellular network and/or the Internet. Configured as such, the ground station 110 may facilitate data communications that the remote support device would otherwise be unable to perform by itself.

For example, the ground station 110 may provide a WiFi connection to the remote device, and serve as a proxy or gateway to a cellular service provider's data network, which the ground station 110 might connect to under an LTE or a 3G protocol, for instance. The ground station 110 could also serve as a proxy or gateway to other ground stations or a command center, which the remote device might not be able to otherwise access.

The ground station 110 may further include a power conversion system 500 that is described in detail below in the discussion related to FIG. 5.

Moreover, as shown in FIG. 2, the tether 120 may include transmission components 222 and a communication link 224. The transmission components 222 may be configured to transmit electrical energy from the aerial vehicle 130 to the ground station 110 and/or transmit electrical energy from the ground station 110 to the aerial vehicle 130. The transmission components 222 may take various different forms in various different embodiments. For example, the transmission components 222 may include one or more conductors that are configured to transmit electricity. In at least one such example, the one or more conductors may include aluminum and/or any other material which allows for conduction of electric current. Moreover, in some implementations, the transmission components 222 may surround a core of the tether 120 (not shown).

The ground station 110 could communicate with the aerial vehicle 130 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 130 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNSS)), such as the GPS coordinates of the aerial vehicle 130. Such GPS data may be utilized by the AWT 100 to provide various functions described herein.

As another example, the sensors 232 may include one or more wind sensors, such as one or more pitot tubes. The one or more wind sensors may be configured to detect apparent and/or relative wind. Such wind data may be utilized by the AWT 100 to provide various functions described herein.

Still as another example, the sensors 232 may include an inertial measurement unit (IMU). The IMU may include both an accelerometer and a gyroscope, which may be used together to determine the orientation of the aerial vehicle 130. In particular, the accelerometer can measure the orientation of the aerial vehicle 130 with respect to earth, while the gyroscope measures the rate of rotation around an axis, such as a centerline of the aerial vehicle 130. IMUs are commercially available in low-cost, low-power packages. For instance, the IMU may take the form of or include a miniaturized micro-electro-mechanical system (MEMS) or a nano-electro-mechanical System (NEMS). Other types of IMUs may also be utilized. The IMU may include other sensors, in addition to accelerometers and gyroscopes, which may help to better determine the position and orientation of the aerial vehicle 130. Two examples of such sensors are magnetometers and pressure sensors. Other examples are also possible.

While an accelerometer and gyroscope may be effective at determining the orientation of the aerial vehicle 130, slight errors in measurement may compound over time and result in a more significant error. However, an example aerial vehicle 130 may be able mitigate or reduce such errors by using a magnetometer to measure direction. One example of a magnetometer is a low-power digital 3-axis magnetometer, which may be used to realize an orientation-independent electronic compass for accurate heading information. However, other types of magnetometers may be utilized as well.

The aerial vehicle 130 may also include a pressure sensor or barometer, which can be used to determine the altitude of the aerial vehicle 130. Alternatively, other sensors, such as sonic altimeters or radar altimeters, can be used to provide an indication of altitude, which may help to improve the accuracy of and/or prevent drift of the IMU. In addition, the aerial vehicle 130 may include one or more load cells configured to detect forces distributed between a connection of the tether 120 to the aerial vehicle 130.

As noted, the aerial vehicle 130 may include the power system 234. The power system 234 could take various different forms in various different embodiments. For example, the power system 234 may include one or more batteries for providing power to the aerial vehicle 130. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 130. In some implementations, the one or more motors or engines may be powered by a fuel, such as a hydrocarbon-based fuel. And in such implementations, the fuel could be stored on the aerial vehicle 130 and delivered to the one or more motors or engines via one or more fluid conduits, such as piping. In some implementations, the power system 234 may be implemented in whole or in part on the ground station 110.

As noted, the aerial vehicle 130 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 130 may include a communication system 238. The communication system 238 may take the form of or be similar in form to the communication system 218. The aerial vehicle 130 may communicate with the ground station 110, other aerial vehicles, and/or other entities (e.g., a command center) via the communication system 238.

In some implementations, the aerial vehicle 130 may be configured to function as a "hotspot," or in other words, as a gateway or proxy between a remote support device (e.g., the ground station 110, the tether 120, other aerial vehicles) and one or more data networks, such as a cellular network and/or the Internet. Configured as such, the aerial vehicle 130 may facilitate data communications that the remote support device would otherwise be unable to perform by itself.

For example, the aerial vehicle 130 may provide a WiFi connection to the remote device, and serve as a proxy or gateway to a cellular service provider's data network, which the aerial vehicle 130 might connect to under an LTE or a 3G protocol, for instance. The aerial vehicle 130 could also serve as a proxy or gateway to other aerial vehicles or a command station, which the remote device might not be able to otherwise access.

As noted, the aerial vehicle 130 may include the one or more processors 242, the program instructions 246, and the data storage 244. The one or more processors 242 can be configured to execute computer-readable program instructions 246 that are stored in the data storage 244 and are executable to provide any of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 130 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 130 and/or at least one entity remotely located from the aerial vehicle 130, such as the ground station 110. Generally, the manner in which the control system 248 is implemented may vary, depending upon the particular application.

While the aerial vehicle 130 has been described above, it should be understood that the methods and systems described herein could involve any suitable aerial vehicle that is connected to a tether, such as the tether 120.

Figure 3:
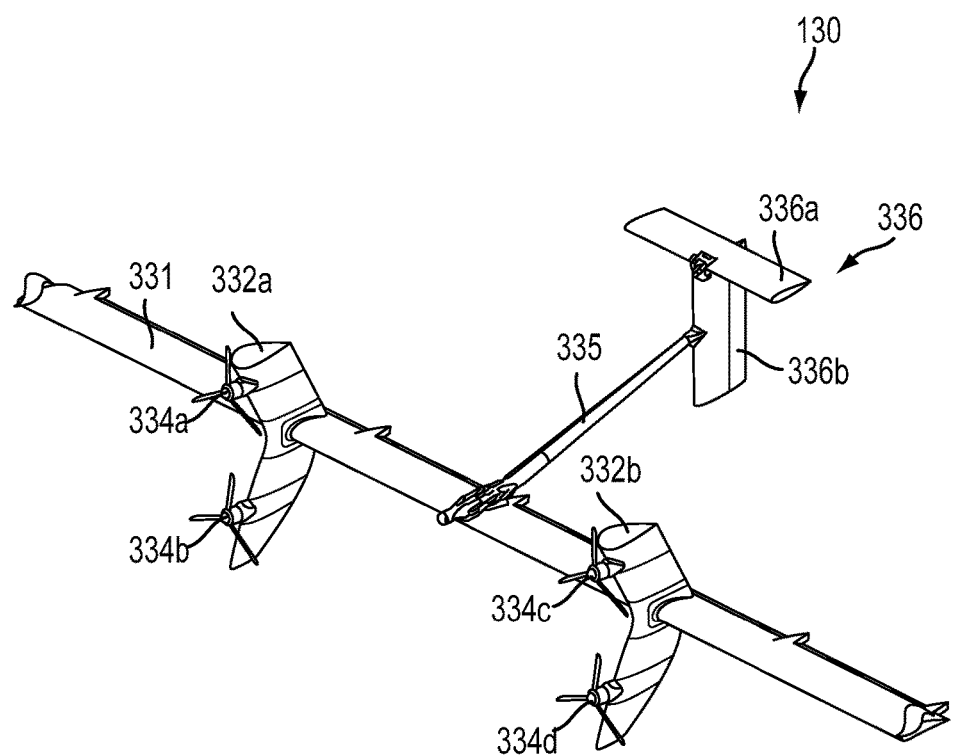
FIG. 3 depicts an aerial vehicle of the AWT, according to an example embodiment.

FIG. 3 depicts the aerial vehicle 130, according to an example embodiment. In particular, the aerial vehicle 130 may include a main wing 331, pylons 332a and 332b, rotors 334a, 334b, 334c, and 334d, a tail boom 335, and a tail wing assembly 336. Any of these components may be shaped in any form which allows for the use of components of lift to resist gravity and/or move the aerial vehicle 130 forward.

The main wing 331 may provide a primary lift force for the aerial vehicle 130. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 130 and/or reduce drag on the aerial vehicle 130 during hover flight, forward flight, and/or crosswind flight.

The main wing 331 and pylons 332a and 332b may be any suitable material for the aerial vehicle 130 to engage in hover flight, forward flight, and/or crosswind flight. For example, the main wing 331 and pylons 332a and 332b may include carbon fiber and/or e-glass, and include internal supporting spars or other structures. Moreover, the main wing 331 and pylons 332a and 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a and 332b may connect the rotors 334a, 334b, 334c, and 334d to the main wing 331. In some examples, the pylons 332a and 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust for the aerial vehicle 130 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 130 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 130. In such implementations, the tail boom 335 may carry a payload.

The tail wing 336a and/or the vertical stabilizer 336b may be used to stabilize the aerial vehicle 130 and/or reduce drag on the aerial vehicle 130 during hover flight, forward flight, and/or crosswind flight. For example, the tail wing 336a and/or the vertical stabilizer 336b may be used to maintain a pitch of the aerial vehicle 130 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 130.

While the aerial vehicle 130 has been described above, it should be understood that the systems and methods described herein could involve any suitable aerial vehicle that is connected to an airborne wind turbine tether, such as the tether 120.

Figure 4:
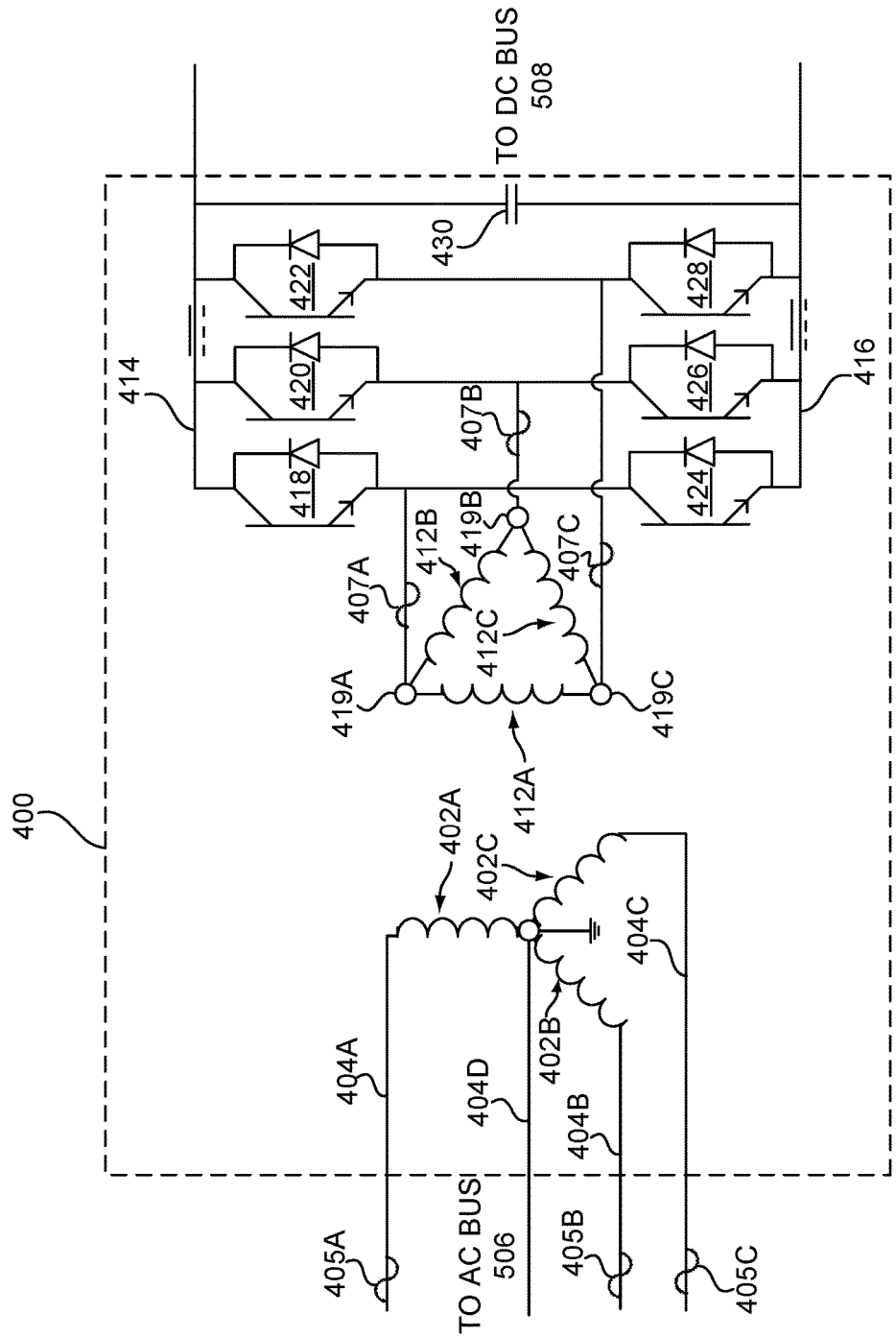
FIG. 4 depicts a bidirectional power converter, according to an example embodiment.

FIG. 4 depicts a bidirectional power converter 400, according to an example embodiment. FIG. 4 illustrates connections between the identified components and is not meant to limit power converter 400 to a specific physical layout of components. Further, power converter 400 may contain additional components not identified in the illustration represented by FIG. 4. Power converters similar to the power converter 400, such as power converters 502A, 502B, 502C, 502D, and 502N, may make up part of a power conversion system 500 shown in FIG. 5. The power conversion system 500 may in turn be included as part of the ground station 110 depicted in FIGS. 1 and 2. In other examples, the power conversion system 500 may be implemented as existing or additional portions of the AWT 100 other than the ground station 110.

The power converter 400 includes AC stage windings 402A, 402B, and 402C, AC terminals 404A, 404B, 404C, and 404D, (DC stage) windings 412A, 412B, and 412C, a positive terminal 414, a negative terminal 416, switches 418, 420, 422, 424, 426, and 428, and a capacitor 430. The power converter 400 may be configured to operate in cooperation with the AWT 100 in either a motoring mode or a power generation mode.

Figure 5:
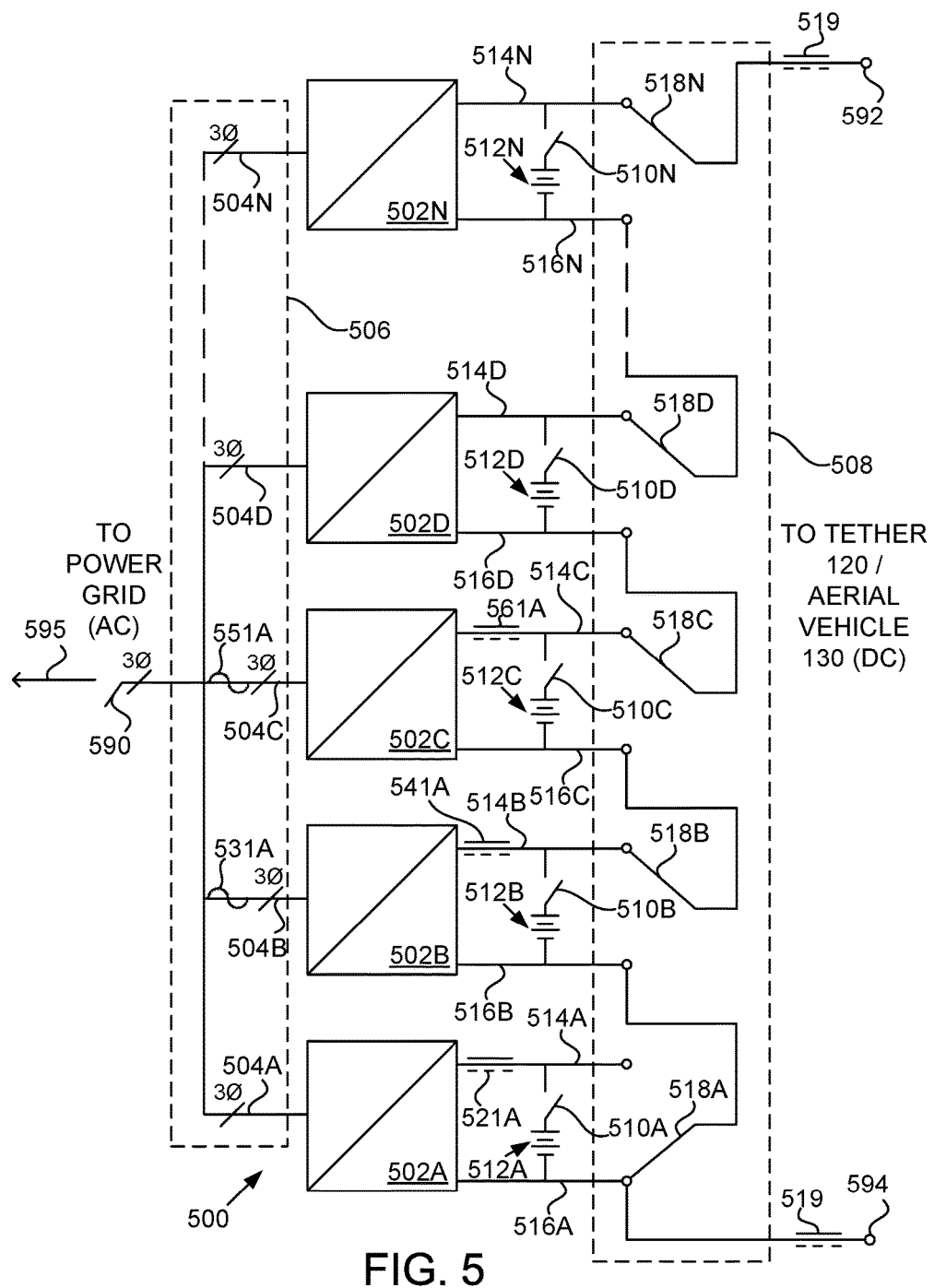
FIG. 5 depicts a power conversion system, according to an example embodiment.

In motoring mode, the AC terminals 404A, 404B, and 404C may receive respective AC currents 405A, 405B, and 405C from an AC bus 506 of the power conversion system 500 (shown in FIG. 5). In some examples, the currents 405A, 405B, and 405C may be mutually out of phase by 120 degrees as is typical in 3-phase AC power implementations. Terminal 404D may act as a ground terminal. The windings 402A, 402B, and 402C may be magnetically coupled to the respective windings 412A, 412B, and 412C. As such, the currents 405A, 405B, and 405C may flow through the respective windings 402A, 402B, and 402C, which may induce currents 407A, 407B, and 407C via the respective windings 412A, 412B, and 412C. In this way, the power converter 400 may use AC currents received from the AC bus 506 to provide DC current to the DC bus 508 as described below.

Each of the switches 418-428 may include a transistor (e.g., a BJT, a MOSFET, etc.) and/or a current blocking diode connected to the transistor as shown in FIG. 4. Base and/or gate terminals are not illustrated on the transistors, but may be assumed to be present on the transistors to provide a means to regulate current flow through the switches. However, the switches 418-428 may also be implemented in any configurations that are known in the art such that the switches 418-428 may be controlled to regulate current flow through the switches.

The switch 418 may operate to either (i) provide a short circuit between the positive terminal 414 and the terminal 419A or (ii) provide an open circuit between the positive terminal 414 and the terminal 419A.

The switch 420 may operate to either (i) provide a short circuit between the positive terminal 414 and the terminal 419B or (ii) provide an open circuit between the positive terminal 414 and the terminal 419B.

The switch 422 may operate to either (i) provide a short circuit between the positive terminal 414 and the terminal 419C or (ii) provide an open circuit between the positive terminal 414 and the terminal 419C.

The switch 424 may operate to either (i) provide a short circuit between the negative terminal 416 and the terminal 419A or (ii) provide an open circuit between the negative terminal 416 and the terminal 419A.

The switch 426 may operate to either (i) provide a short circuit between the negative terminal 416 and the terminal 419B or (ii) provide an open circuit between the negative terminal 416 and the terminal 419B.

The switch 428 may operate to either (i) provide a short circuit between the negative terminal 416 and the terminal 419C or (ii) provide an open circuit between the negative terminal 416 and the terminal 419C.

While AC current is provided via AC bus 506, the switches 418-428 may be operated such that, in conjunction with the capacitor 430, a substantially stable DC voltage is generated between the positive terminal 414 and the negative terminal 416. The DC voltage may be provided to the DC bus 508 of the power conversion system 500.

In generation mode, the power converter 400 may receive, from the DC bus 508, a DC voltage between the positive terminal 414 and the negative terminal 416. The DC voltage may ultimately be the result of power generated by the aerial vehicle 130 and transmitted to the power conversion system 500 via the tether 120. The AC currents 407A, 407B, and 407C generated using the switches 418-428 may pass into the delta network of windings 412A, 412B, and 412C, which may induce AC currents 405A, 405B and 405C that flow from the respective windings 402A-C into the AC bus 506. The switches 418-428 may be operated to control the flow of DC currents 407A-C such that AC currents 405A, 405B, and 405C are generated to be mutually out of phase by 120 degrees. In this way, the power converter 400 may use DC current received from the DC bus 508 to provide AC current to the AC bus 506.

FIG. 5 depicts the power conversion system 500, according to an example embodiment. The power conversion system 500 includes bidirectional power converters 502A, 502B, 502C, 502D, through 502N. The power conversion system 500 is depicted in FIG. 5 as including five power converters, however, any number of power converters may be included as part of the power conversion system 500. Each of the power converters 502A-N may be implemented as an instance of the power converter 400 depicted in FIG. 4, for example.

The power conversion system 500 further includes AC ports 504A, 504B, 504C, 504D, and 504N. Each of the AC ports 504A-N may include 4 terminals that correspond to the terminals 404A-D depicted in FIG. 4. As such, the power grid and the AC bus 506 may be implemented in a 3-phase/4-wire implementation, but other examples are possible. The AC bus 506 may be implemented so that "A" phase terminals of each of the power converters 502A-N are electrically connected to each other, "B" phase terminals of each of the power converters 502A-N are electrically connected to each other, "C" phase terminals of each of the power converters 502A-N are electrically connected to each other, and/or ground terminals of each of the power converters 502A-N are electrically connected to each other. These terminals may then be connected in kind to the power grid (not shown).

The power conversion system 500 further includes positive terminals 514A, 514B, 514C, 514D, and 514N, negative terminals 516A, 516B, 516C, 516D, and 516N, and a DC bus 508 that further includes switches 518A, 518B, 518C, 518D, and 518N. The switches 518A-N may be controllable switches and implemented as transistors or relays, for example, and may further include conditioning elements such as flyback diodes.

In some examples, the positive terminal 514A and the negative terminal 516A may be referred to collectively as a DC port 514A/516A. The positive terminal 514B and the negative terminal 516B may be referred to collectively as a DC port 514B/516B. The positive terminal 514C and the negative terminal 516C may be referred to collectively as a DC port 514C/516C. The positive terminal 514D and the negative terminal 516D may be referred to collectively as a DC port 514D/516D. The positive terminal 514N and the negative terminal 516N may be referred to collectively as a DC port 514N/516N.

The switch 518A may be operable to either (i) electrically connect the DC port 514A/516A to the DC bus 508 or (ii) electrically isolate the DC port 514A/516A from the DC bus 508. As shown in FIG. 5, the switch 518A is positioned to electrically isolate the DC port 514A/516A from the DC bus 508. When the DC port 514A/516A is electrically isolated from the DC bus 508, the current 519 flowing through the DC bus 508 will not flow through the power converter 502A.

The switch 518B may be operable to either (i) electrically connect the DC port 514B/516B to the DC bus 508 or (ii) electrically isolate the DC port 514B/516B from the DC bus 508. As shown in FIG. 5, the switch 518B is positioned to electrically connect the DC port 514B/516B to the DC bus 508. When the DC port 514B/516B is electrically connected to the DC bus 508, the current 519 flowing through the DC bus 508 will also flow through the power converter 502B.

The switch 518C may be operable to either (i) electrically connect the DC port 514C/516C to the DC bus 508 or (ii) electrically isolate the DC port 514C/516C from the DC bus 508. As shown in FIG. 5, the switch 518C is positioned to electrically connect the DC port 514C/516C to the DC bus 508. When the DC port 514C/516C is electrically connected to the DC bus 508, the current 519 flowing through the DC bus 508 will also flow through the power converter 502C.

The switch 518D may be operable to either (i) electrically connect the DC port 514D/516D to the DC bus 508 or (ii) electrically isolate the DC port 514D/516D from the DC bus 508. As shown in FIG. 5, the switch 518D is positioned to electrically connect the DC port 514D/516D to the DC bus 508. When the DC port 514D/516D is electrically connected to the DC bus 508, the current 519 flowing through the DC bus 508 will also flow through the power converter 502D.

The switch 518N may be operable to either (i) electrically connect the DC port 514N/516N to the DC bus 508 or (ii) electrically isolate the DC port 514N/516N from the DC bus 508. As shown in FIG. 5, the switch 518N is positioned to electrically connect the DC port 514N/516N to the DC bus 508. When the DC port 514N/516N is electrically connected to the DC bus 508, the current 519 flowing through the DC bus 508 will also flow through the power converter 502N.

The DC bus 508 may be electrically connected to the aerial vehicle 130 via the tether 120. That is, the current 519 may flow to or from the aerial vehicle 130 via the DC bus 508 and the tether 120.

The power conversion system 500 may also include switches 510A, 510B, 510C, 510D, and 510N, and power supplies 512A, 512B, 512C, 512D, and 512N. The switches 510A-N may be controllable switches and may be implemented as transistors or relays, for example, and may further include conditioning elements such as flyback diodes. The power supplies 512A-N may be implemented as batteries, for example.

The switch 510A may be operable to either (i) electrically connect the power supply 512A to the DC port 514A/516A or (ii) electrically isolate the power supply 512A from the DC port 514A/516A. As shown in FIG. 5, the switch 510A is positioned to electrically isolate the power supply 512A from the DC port 514A/516A.

The switch 510B may be operable to either (i) electrically connect the power supply 512B to the DC port 514B/516B or (ii) electrically isolate the power supply 512B from the DC port 514B/516B. As shown in FIG. 5, the switch 510B is positioned to electrically isolate the power supply 512B from the DC port 514B/516B.

The switch 510C may be operable to either (i) electrically connect the power supply 512C to the DC port 514C/516C or (ii) electrically isolate the power supply 512C from the DC port 514C/516C. As shown in FIG. 5, the switch 510C is positioned to electrically isolate the power supply 512C from the DC port 514C/516C.

The switch 510D may be operable to either (i) electrically connect the power supply 512D to the DC port 514D/516D or (ii) electrically isolate the power supply 512D from the DC port 514D/516D. As shown in FIG. 5, the switch 510D is positioned to electrically isolate the power supply 512D from the DC port 514D/516D.

The switch 510N may be operable to either (i) electrically connect the power supply 512N to the DC port 514N/516N or (ii) electrically isolate the power supply 512N from the DC port 514N/516N. As shown in FIG. 5, the switch 510N is positioned to electrically isolate the power supply 512N from the DC port 514N/516N.

Each of the power converters 502A-N may operate alternatively in a first mode, a second mode, a third mode, or a fourth mode.

Taking the power converter 502A as an example, in the first mode the switch 510A may be open and the switch 518A may contact the negative terminal 516A instead of the positive terminal 514A. In the first mode, the DC port 514A/516A is electrically isolated from the DC bus 508 and the power supply 512A is electrically isolated from the DC port 514A/516A. In the first mode, neither the power converter 502A nor the power supply 512A can provide power to the DC bus 508 via the DC port 514A/516A. In the first mode, the power supply 512A cannot provide power to the DC bus 508 indirectly via the AC bus 506 either. The first mode may apply if the power converter 502A is not in use.

In the second mode, the switch 510A may be open and the switch 518A may contact the positive terminal 514A instead of the negative terminal 516A. In the second mode, the DC port 514A/516A is electrically connected to the DC bus 508 and the power supply 512A is electrically isolated from the DC port 514A/516A. In the second mode, the power converter 502A is configured to receive, via the AC bus 506, AC current from the power grid and provide DC current to the aerial vehicle 130 via the DC bus 508 and the tether 120. The second mode may be useful for providing power to the aerial vehicle 130 when the aerial vehicle 130 is in motoring mode and the power grid is functioning properly. The second mode may also be useful for providing power to the power grid when the aerial vehicle 130 is in power generation mode and is functioning properly.

In the third mode, the switch 510A may be closed and the switch 518A may contact the negative terminal 516A instead of the positive terminal 514A. In the third mode, the DC port 514A/516A is electrically isolated from the DC bus 508 and the power supply 512A is electrically connected to the DC port 514A/516A. In the third mode, the power converter 502A is configured to receive DC current from the power supply 512A and provide AC current to the AC bus 506. The third mode may be useful in the event of a power grid failure in that the power supply 512A can provide additional current to the aerial vehicle 130 via the AC bus 506 without providing additional voltage to the aerial vehicle 130.

In the fourth mode, the switch 510A may be closed and the switch 518A may contact the positive terminal 514A instead of the negative terminal 516A. In the fourth mode, the DC port 514A/516A is electrically connected to the DC bus 508 and the power supply 512A is electrically connected to the DC port 514A/516A. In the fourth mode, the power supply 512A is configured to provide DC power directly to the aerial vehicle 130 via the DC bus 508 and the tether 120. The fourth mode may be useful in the event of a power grid failure in that the power supply 512A can provide additional voltage to the aerial vehicle 130 via the DC bus 508.

Figure 6:
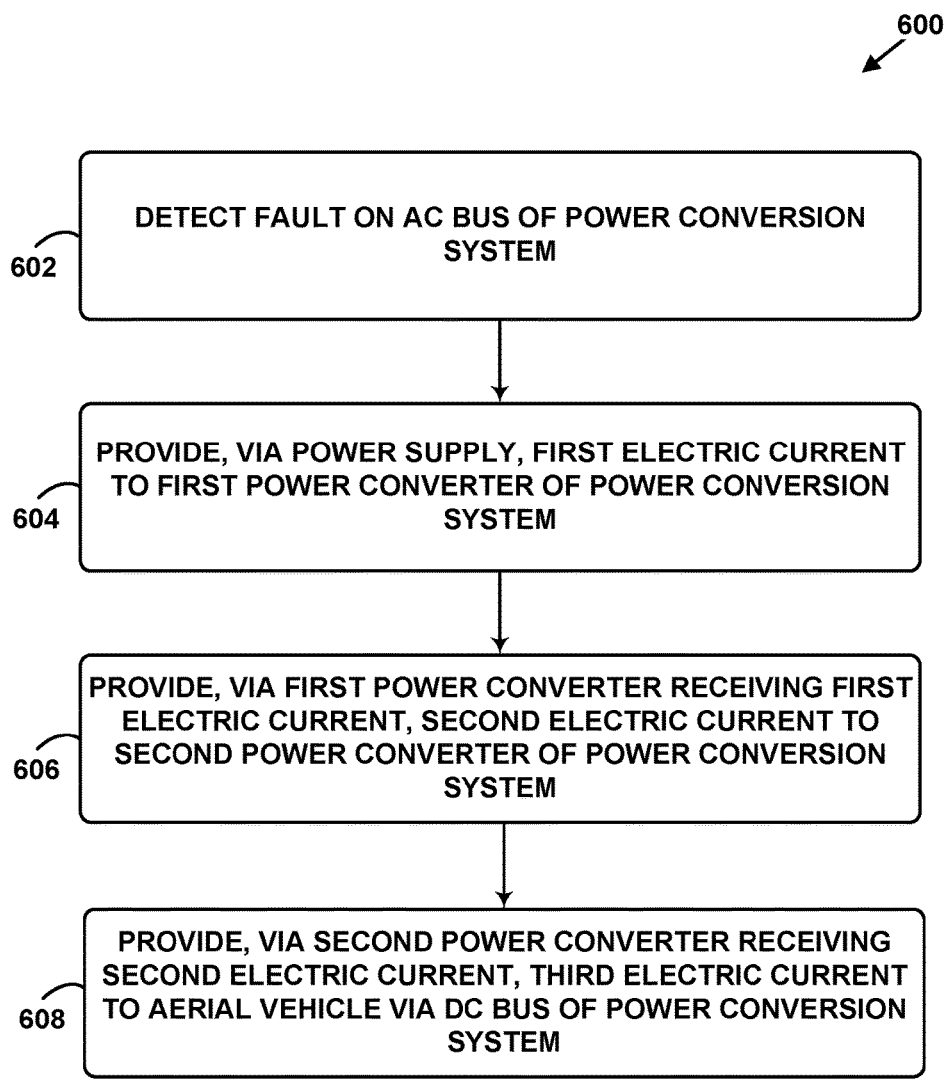
FIG. 6 is a block diagram depicting a method, according to an example embodiment.
Figure 7:
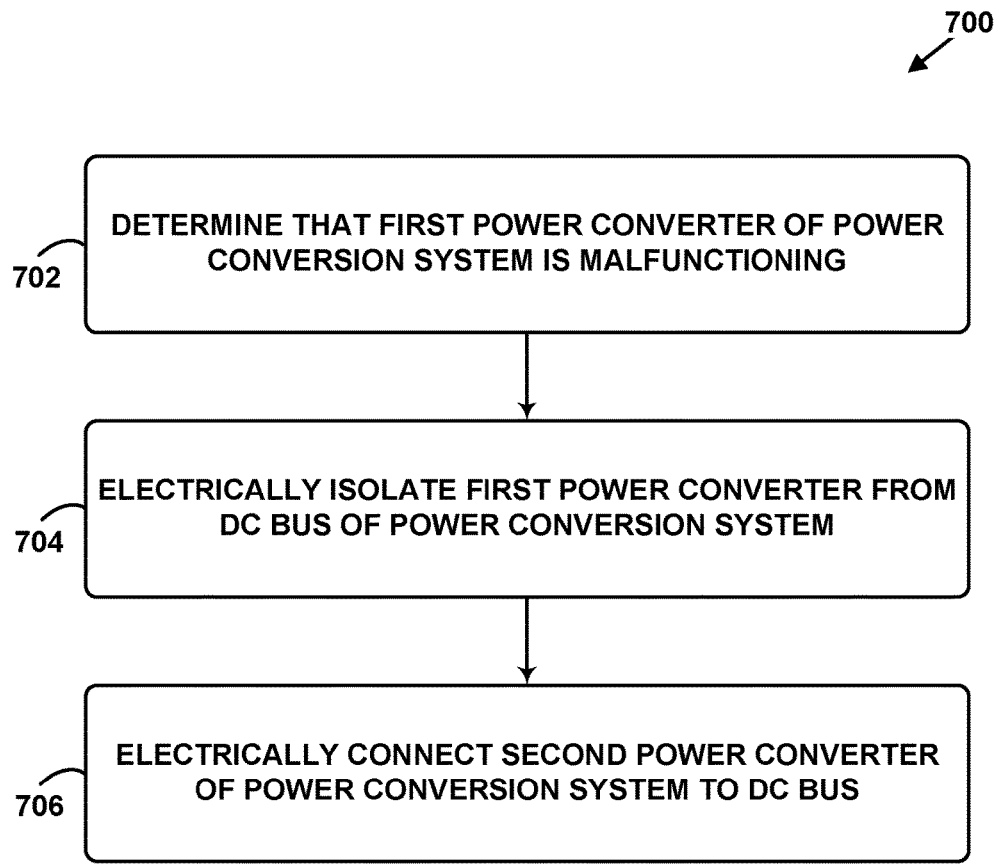
FIG. 7 is a block diagram depicting another method, according to an example embodiment.
Figure 8:
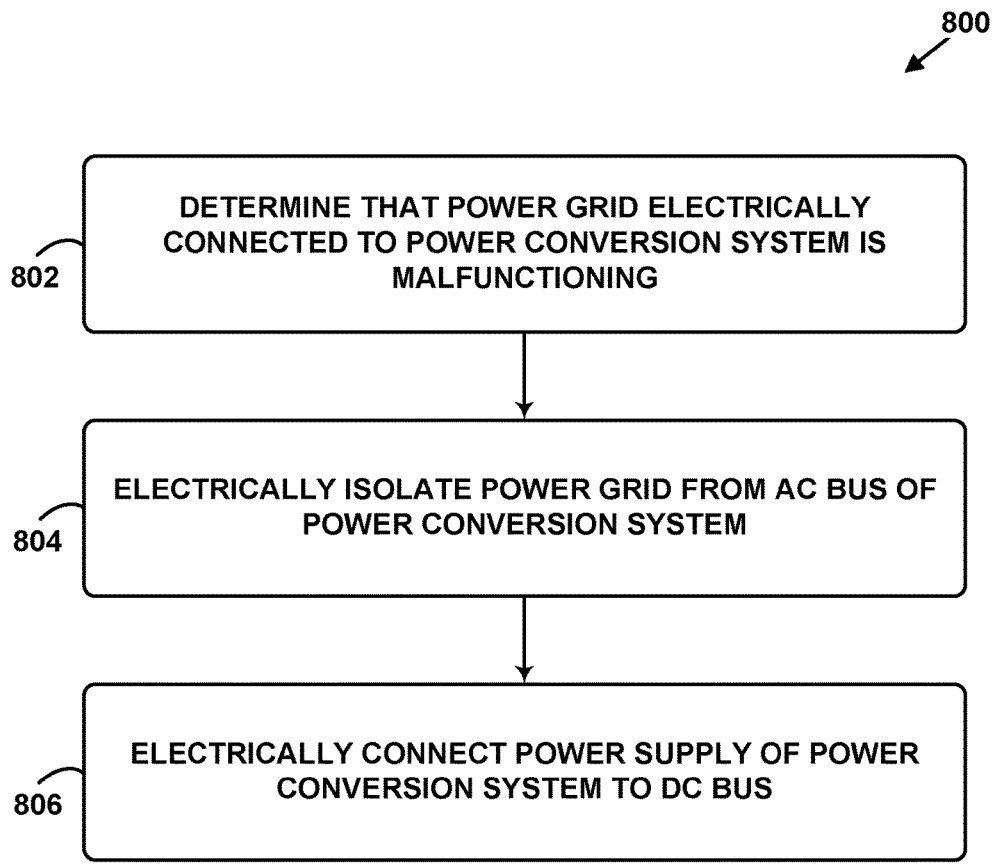
FIG. 8 is a block diagram depicting yet another method, according to an example embodiment.

Methods 600, 700, and 800 respectively shown in FIG. 6, FIG. 7, and FIG. 8, present example methods that can be performed by one or more AWT such as the AWT 100. In some examples, the methods 600, 700, and 800 may be performed by the power conversion system 500 and processors 212 executing program instructions 216. The methods 600, 700, and 800 may be performed by any combination of one or more suitable components described herein. FIGS. 6-8 may include one or more operations, functions, or actions as illustrated by one or more of blocks 602-608, 702-706, and 802-806. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods 600, 700, and 800, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the methods 600, 700, and 800, and other processes and methods disclosed herein, each block in FIGS. 6-8 may represent circuitry that is wired to perform the specific logical functions in the process.

FIG. 6 is a block diagram depicting the method 600, according to an example embodiment.

At block 602, the method 600 includes detecting a fault on an AC bus of a power conversion system. For example, voltmeters (not shown) may be used to monitor a phase-to-ground voltage or a phase-to-phase voltage on the AC bus 506 of the power conversion system 500. (In another example, voltmeters may be used to monitor a voltage on a single-phase AC bus.) The voltmeters may provide signals representing such voltages to the processor(s) 212 of the ground station 110, or to a Boolean circuit (not shown) configured to perform functions based on the signals received from the voltmeters. The Boolean circuit may be implemented as part of the ground station 110, but other examples are possible.

Detecting a fault on the AC bus 506 may include the processor(s) 212 or the Boolean circuit performing at least one of (i) determining that a voltage on the AC bus 506 is greater than a threshold voltage, (ii) determining that a voltage on the AC bus 506 is less than a threshold voltage, or (iii) determining that a variation of voltage on the AC bus 506 is greater than a threshold voltage variance. Such overvoltages, undervoltages, or excessive variances in voltage may be indicators that the power grid or the AC bus 506 is malfunctioning. Using a nominal AC bus voltage of 480 volts RMS as an example, a (minimum) threshold voltage might be 432 volts RMS, and a (maximum) threshold voltage might be 528 volts RMS. These threshold voltages may correspond to a +/−10% threshold variance from the nominal voltage. Other examples of nominal voltages, threshold voltages, and threshold voltage variances are possible.

At block 604, the method 600 includes, in response to detecting the fault, providing, via a power supply of the power conversion system, a first DC electric current to a first power converter of the power conversion system. For example, in response to detecting the fault on the AC bus 506, the processor(s) 212 or the Boolean circuit may close the switch 510A and position the switch 518A so that the switch 518A contacts the negative terminal 516A instead of the positive terminal 514A. In this state, the power converter 502A and the power supply 512A may be isolated from the DC bus 508, and the power supply 512A may provide the DC electric current 521A to the power converter 502A via the positive terminal 514A and the negative terminal 516A.

At block 606, the method 600 includes providing, via the first power converter receiving the first DC electric current, a first AC electric current to a second power converter of the power conversion system. For example, the power converter 502A may, via receiving the DC current 521A, provide AC currents 531A to the power converter 502B. Note that the AC currents 531A might or might not represent the entirety of current flowing into the AC port 504B. Note that in the example shown in FIG. 5, AC currents provided to the AC bus 506 by the power converter 502A may flow into any of the other power converters 502B-N, unless such power converters were to be isolated from the AC bus 506. The AC currents provided to the power converter 502B by the power converter 502A may be referred to as the currents 531A.

At block 608, the method 600 includes providing, via the second power converter receiving the first AC electric current, a second DC electric current to the aerial vehicle via a DC bus of the power conversion system. For example, the power converter 502B may, via receiving the currents 531A, provide current 541A to the DC bus 508 and/or the aerial vehicle 130 via the tether 120.

In some contexts, the method 600 further includes, prior to providing the first DC electric current to the first power converter, electrically isolating the AC bus from the power grid. For example, prior to the power supply 512A providing the DC electric current 521A to the power converter 502A, the processor(s) 212 or the Boolean circuit may open the switch 590 to isolate the AC bus 506 from the power grid. This may be done to prevent a malfunctioning power grid from damaging components of the power conversion system 500 or interfering with backup power operations.

In some contexts, the method 600 further includes providing, via the first power converter receiving the first DC electric current, a second AC electric current to a third power converter of the power conversion system. For example, in addition to providing the AC electric currents 531A to the power converter 502B, the power converter 502A may also provide the AC electric currents 551A to the power converter 502C. The AC currents 551A might or might not represent the entirety of current flowing into the power converter 502C via the AC port 504C. The AC currents 551A may be provided by the power converter 502A in a manner similar to how the power converter 502A may provide the AC currents 531A, as described above. Likewise, the DC current 561A may be provided to the DC bus 508 and/or the aerial vehicle 130 by the power converter 502C in a manner similar to how the power converter 502B may provide the DC current 541A, as described above.

In this way, the power supply 512A may be used to provide backup or auxiliary power to the aerial vehicle 130 so that, during a malfunction of the power grid, the aerial vehicle 130 may use the additional power for maneuvering back to the ground station 110 for safe landing, for example. In motoring mode, the nominal voltage provided across the terminals 592 and 594 of the DC bus 508 may be about 3,400 volts, which might be provided using the (primary) power converters 502B-N, but not power converter 502A, which may be a backup power converter. In this case, since the power converter 502A is isolated from the DC bus 508, the power supply 512A can provide additional current to the aerial vehicle 130 by transferring power "backwards" via the power converter 502A and "forward" via the power converter 502B (and/or power converters 502C-N).

FIG. 7 is a block diagram depicting the method 700, according to an example embodiment.

At block 702, the method 700 includes determining that a first power converter of a power conversion system is malfunctioning. For example, voltmeters (not shown) may be used to monitor a DC voltage between terminals 514A and 516A. Alternatively or additionally, voltmeters may be used to monitor phase-to-phase or phase-to-ground voltages of the AC port 504. The voltmeters may provide signals representing such voltages to the processor(s) 212 of the ground station 110, or to a Boolean circuit (not shown) configured to perform functions based on the signals received from the voltmeters. The Boolean circuit may be implemented as part of the ground station 110, but other examples are possible.

Determining that the power converter 502A is malfunctioning may include the processor(s) 212 or the Boolean circuit performing at least one of (i) determining that a voltage at the AC port 504A and/or between the terminals 514A and 516A is greater than a threshold voltage, (ii) determining that a voltage at the AC port 504A and/or between the terminals 514A and 516A is less than a threshold voltage, or (iii) determining that a variation of a voltage at the AC port 504A and/or between the terminals 514A and 516A is greater than a threshold voltage variance. Such overvoltages, undervoltages, or excessive variances in voltage may be indicators that the power converter 502A is malfunctioning. Examples of nominal AC voltages, threshold AC voltages, and threshold AC voltage variances may be found above in the discussion related to block 602, however other examples are possible. Using a nominal DC voltage of 600 volts as an example, a (minimum) threshold voltage might correspond to 540 volts DC, and a (maximum) threshold voltage might correspond to 660 volts DC. These threshold voltages may correspond to a +/−10% threshold variance from the nominal voltage. Other examples of nominal voltages, threshold voltages, and threshold voltage variances are possible At block 704, the method 700 includes, in response to determining that the first power converter is malfunctioning, electrically isolating the first power converter from a DC bus of the power conversion system.

For example, the processor(s) 212 or the Boolean circuit may determine that the power converter 502A is malfunctioning and electrically isolate the power converter 502A from the DC bus 508. More specifically, the processor(s) 212 or the Boolean circuit may control the switch 518A so that the switch 518A is in contact with the negative terminal 516A and not the positive terminal 514A.

At block 706, the method includes, in response to determining that the first power converter is malfunctioning, electrically connecting a second power converter of the power conversion system to the DC bus.

For example, the processor(s) 212 or the Boolean circuit may electrically connect the power converter 502B to the DC bus 508. More specifically, the processor(s) 212 or the Boolean circuit may control the switch 518B so that switch 518B is in contact with the positive terminal 514B and not the negative terminal 516B.

In this way, the power converter 502B may be used as a "backup" power converter in the event that the power converter 502A malfunctions. In power generation mode, by activating a backup power converter in place of a malfunctioning primary power converter, nominal voltages can be maintained across each of the power converters 502A-N that are active. Similarly, in motoring mode, a nominal voltage corresponding to a predetermined number of power converters connected in series can be properly maintained.

FIG. 8 is a block diagram depicting the method 800, according to an example embodiment.

At block 802, the method 800 includes determining that a power grid electrically connected to a power conversion system is malfunctioning. For example, voltmeters (not shown) may be used to monitor phase-to-phase or phase-to-ground voltage between phase terminals of an AC main 595 of the AC bus 506. The voltmeters may provide signals representing such voltages to the processor(s) 212 of the ground station 110, or to a Boolean circuit (not shown) configured to perform functions based on the signals received from the voltmeters. The Boolean circuit may be implemented as part of the ground station 110, but other examples are possible.

Determining that the power grid is malfunctioning may include the processor(s) 212 or the Boolean circuit performing at least one of (i) determining that a phase-to-phase or phase-to-ground voltage at phase terminals of the AC main 595 is greater than a threshold voltage, (ii) determining that a phase-to-phase or phase-to-ground voltage at phase terminals of the AC main 595 is less than a threshold voltage, or (iii) determining that a variation of a phase-to-phase or phase-to-ground voltage at phase terminals of the AC main 595 is greater than a threshold voltage variance. Such overvoltages, undervoltages, or excessive variances in voltage may be indicators that the power grid is malfunctioning. Examples of nominal voltages, threshold voltages, and threshold voltage variances may be found above in the discussion related to block 602, however other examples are possible.

At block 804, the method further includes, in response to determining that the power grid is malfunctioning, electrically isolating the power grid from an AC bus of the power conversion system. For example, the processor(s) 212 or the Boolean circuit may determine that the power grid is malfunctioning and electrically isolate the power grid from the AC bus 506. More specifically, the processor(s) 212 or the Boolean circuit may open the switch 590 so that the power grid is isolated from the AC bus 506.

At block 806, the method 800 further includes, in response to determining that the power grid is malfunctioning, electrically connecting a power supply of the power conversion system to the DC bus. For example, the processor(s) 212 or the Boolean circuit may electrically connect one or more of the power supplies 512A-N to the DC bus 508 via one or more of the switches 510A-N and 518A-N. More specifically, the processor(s) 212 or the Boolean circuit may control one or more of the switches 510A-N so that the switches 510A-N connect the power supplies 512A-N to their respective positive terminals 514A-N. The processor(s) 212 or the Boolean circuit may also control the one or more switches 518A-N so that the switches 518A-N are in contact with the respective positive terminals 514A-N and not the respective negative terminals 516A-N. This may allow the power supplies 512A-N to provide power directly to the DC bus 508.

In this way, the power supplies 512A-N may be used as backup power in lieu of the power grid in the event that the power grid malfunctions. By activating power supplies in place of the malfunctioning power grid, a nominal voltage can be provided to the aerial vehicle via the DC bus 508 and the tether 120.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A method for operating a power conversion system, the method comprising:
   detecting a fault that occurs on an AC bus of a power conversion system, wherein the power conversion system is configured to provide AC/DC power conversion between an aerial vehicle of an airborne wind turbine and the AC bus;
   in response to detecting the fault that occurs on the AC bus, providing a first DC electric current to a first power converter of the power conversion system via connecting a power supply of the power conversion system to the first power converter via a first switch;
   providing, via the first power converter receiving the first DC electric current, an AC electric current to a second power converter of the power conversion system, wherein the AC electric current passes through at least a portion of the AC bus; and
   providing, via the second power converter receiving the AC electric current, a second DC electric current to the aerial vehicle via a DC bus of the power conversion system.

2. The method of claim 1, wherein the DC bus is electrically connected to the aerial vehicle via a tether.

3. The method of claim 1, further comprising electrically isolating the power supply from the DC bus.

4. The method of claim 1, wherein the power supply comprises a battery.

5. The method of claim 1, wherein detecting the fault comprises at least one of (i) determining that a voltage on the AC bus is greater than a threshold voltage, (ii) determining that a voltage on the AC bus is less than a threshold voltage, or (iii) determining that a variation of voltage on the AC bus is greater than a threshold voltage variance.

6. The method of claim 1,
   wherein the first power converter comprises one or more first DC stage windings and one or more first AC stage windings,
   wherein the second power converter comprises one or more second DC stage windings and one or more second AC stage windings,
   wherein providing the first DC electric current to the first power converter comprises providing the first DC electric current to the one or more first DC stage windings,
   wherein providing the AC electric current to the second power converter comprises providing the AC electric current, to the one or more second AC stage windings, via mutual inductance between the one or more first DC stage windings and the one or more first AC stage windings, and
   wherein providing the second DC electric current to the aerial vehicle comprises providing, from the one or more second DC stage windings, the second DC electric current via mutual inductance between the one or more second DC stage windings and the one or more second AC stage windings.

7. The method of claim 1, wherein the AC electric current is a first AC electric current, the method further comprising:
   providing, via the first power converter receiving the first DC electric current, a second AC electric current to a third power converter of the power conversion system, wherein the second AC electric current passes through at least a portion of the AC bus; and
   providing, via the third power converter receiving the second AC electric current, a third DC electric current to the aerial vehicle via the DC bus of the power conversion system.

8. A power conversion system comprising:
   a first power converter comprising (i) a first AC port and (ii) a first DC port, wherein the first power converter is configured to provide AC/DC power conversion between the first AC port and the first DC port;
   a second power converter comprising (i) a second AC port and (ii) a second DC port, wherein the second power converter is configured to provide AC/DC power conversion between the second AC port and the second DC port;
   an AC bus electrically connected to (i) a power grid, (ii) the first AC port, and (iii) the second AC port;
   a DC bus electrically connected via a tether to an aerial vehicle of an airborne wind turbine;
   a first switch operable to either (i) electrically connect the first DC port to the DC bus or (ii) electrically isolate the first DC port from the DC bus;
   a second switch operable to either (i) electrically connect the second DC port to the DC bus or (ii) electrically isolate the second DC port from the DC bus;
   a power supply; and
   a third switch, wherein the third switch is operable to either (i) electrically connect the power supply to the first DC port or (ii) electrically isolate the power supply from the first DC port,
   wherein the first power converter is configured to operate alternatively in a first mode, a second mode, a third mode, or a fourth mode, wherein:
      in the first mode the first DC port is electrically isolated from the DC bus and the power supply is electrically isolated from the first DC port,
      in the second mode the first DC port is electrically connected to the DC bus and the power supply is electrically isolated from the first DC port, in the third mode the first DC port is electrically isolated from the DC bus and the power supply is electrically connected to the first DC port, and in the fourth mode the first DC port is electrically connected to the DC bus and the power supply is electrically connected to the first DC port.

9. The power conversion system of claim 8, wherein the power supply comprises a battery.

10. The power conversion system of claim 8, wherein in the second mode the first power converter is configured to receive, via the AC bus, AC current from the power grid and provide DC current to the aerial vehicle via the DC bus.

11. The power conversion system of claim 8, wherein in the third mode the first power converter is configured to receive DC current from the power supply and provide AC current to the AC bus.

12. The power conversion system of claim 8, wherein in the fourth mode the power supply is configured to provide DC current to the aerial vehicle via the DC bus.

13. The power conversion system of claim 8, wherein the first AC port comprises a 3-phase AC port.

14. The power conversion system of claim 8, wherein the first AC port comprises a 3-phase/4-wire AC port.

15. The power conversion system of claim 8, wherein the second AC port comprises a 3-phase AC port.

16. The power conversion system of claim 8, wherein the second AC port comprises a 3-phase/4-wire AC port.

* * * * *